Jan. 23, 1968   H. J. SHAY   3,365,226
DOOR LATCH FOR AUTOMOTIVE VEHICLES
Filed April 10, 1967   7 Sheets-Sheet 7

INVENTOR
Harry J. Shay
by Wolfe, Hubbard, Voit & Osann
ATTORNEYS

United States Patent Office 3,365,226
Patented Jan. 23, 1968

3,365,226
DOOR LATCH FOR AUTOMOTIVE VEHICLES
Harry J. Shay, Rockford, Ill., assignor to
L. W. Menzimer, as trustee
Continuation-in-part of application Ser. No. 483,483,
Aug. 30, 1965. This application Apr. 10, 1967, Ser.
No. 634,017
14 Claims. (Cl. 292—216)

ABSTRACT OF THE DISCLOSURE

A latch for the door of an automotive vehicle and including a pivoted transfer member normally coupling a manually operable push button with a pawl which releases a latching element when the push button is depressed. To lock the latch, a locking lever may be moved to a locked position by a garnish button to shift the transfer member to a position uncoupling the push button and the pawl so that the push button makes an idle movement with respect to the pawl when the push button is depressed. Unintentional keyless locking is prevented by a cancelling lever which operates in response to closing of the door to move the locking lever to an unlocked position unless a manual operation in addition to depression of the garnish button is performed to disable the cancelling lever. The latter is disabled and moved to an inactive position by the idle motion undertaken by the push button when the push button is depressed with the door open and with the locking lever in a locked position. In one embodiment of the invention, the push button must be held in a depressed condition while the door is closed in order to disable the cancelling lever while, in a second embodiment, the cancelling lever is disabled by depressing the push button only momentarily and then closing the door in a normal fashion.

Cross-reference to a related application

This application is a continuation-in-part of my application Ser. No. 483,483, filed Aug. 30, 1965, and now abandoned.

Background of the invention

This invention relates to a latch of the type commonly used to latch the door of an automotive vehicle and, more particularly, to a latch in which a latching element is held in engagement with a striker by the coaction of a pawl and a ratchet, the pawl being retracted away from the ratchet to release the latching element as an incident to movement of a manually actuated member. The invention has more specific reference to a latch which is locked by moving a connector normally coupling the pawl and the manually actuated member out of engagement therewith so the manual member makes only an idle motion when actuated. Movement of the connector, and thus locking of the door, may be accomplished from the outside by a key or from the inside by either a remote handle or a garnish molding button.

Summary of the invention

The primary aim of this invention is to provide a new and improved latch of the above character which is self-cancelling in that the latch is set automatically in the unlocked condition upon being latched as the door is closed so as to prevent unintentional locking of the door, and in which the self-cancelling feature may be disabled if certain sequential operations are performed on the latch prior to closing the door so that the latch then will remain locked when the door is closed. With one embodiment of the invention, the door may be locked and the self-cancelling action may be disabled first with the performance of two manual operations in proper sequence, and then with nothing more than simply swinging the door closed in a normal fashion.

In a more detailed aspect, the invention contemplates a novel latch of the above type which may be locked by setting the latch in the locked condition when the door is open and by utilizing the idle motion range of the manually actuated member to disable the self-cancelling action.

Detailed description

As shown in the drawings for purposes of illustration, the invention is embodied in a latch 20 particularly adapted for use with the door 21 of an automotive vehicle and includes a pivoted latching element 22 carried by the door and coacting with a striker 23 mounted on a post 24 of the vehicle frame to hold the door in a closed position. Herein, the latching element 22 is in the form of a fork 25 forming a recess 25a into which the striker 23 moves as the door is closed. Contact of the edge of the recess with the striker turns the latching element counterclockwise from the position illustrated in FIG. 3 to that illustrated in FIG. 2 to prevent separation of the striker and the latching element and thus hold the door closed.

To support the latching element 22, a bracket 26 disposed within the door 21 is formed with a base plate 27 which is secured against the inside of the end wall 28 of the door. Attached to this base plate is a flange 29 extending along the inner wall 30 of the door and a flange 31 extending adjacent the outer wall 32 of the door. The latching element is fastened on the outer end of a shaft 34 which is journaled on the base plate adjacent a recess 35 formed in the plate and extending around into the flange 29 of the bracket to receive the striker.

The edge of the latching element opposite the fork 25 forms a ratchet 36 comprising a pair of teeth 37 and 38 which cooperate with a pawl 39 to hold the latch releasably in the safety and latched conditions. The pawl is fulcrumed on a pin 40 fixed on the base plate 27 of the bracket 26 and includes one arm extending downwardly and terminating in a hook 41 positioned to engage the ratchet teeth 37 and 38. A second arm 42 on the pawl extends inwardly from the pin 40 and parallel to the base plate 27 and is formed with a free end portion which passes through a slot 43 in the flange 29.

Figure 2:
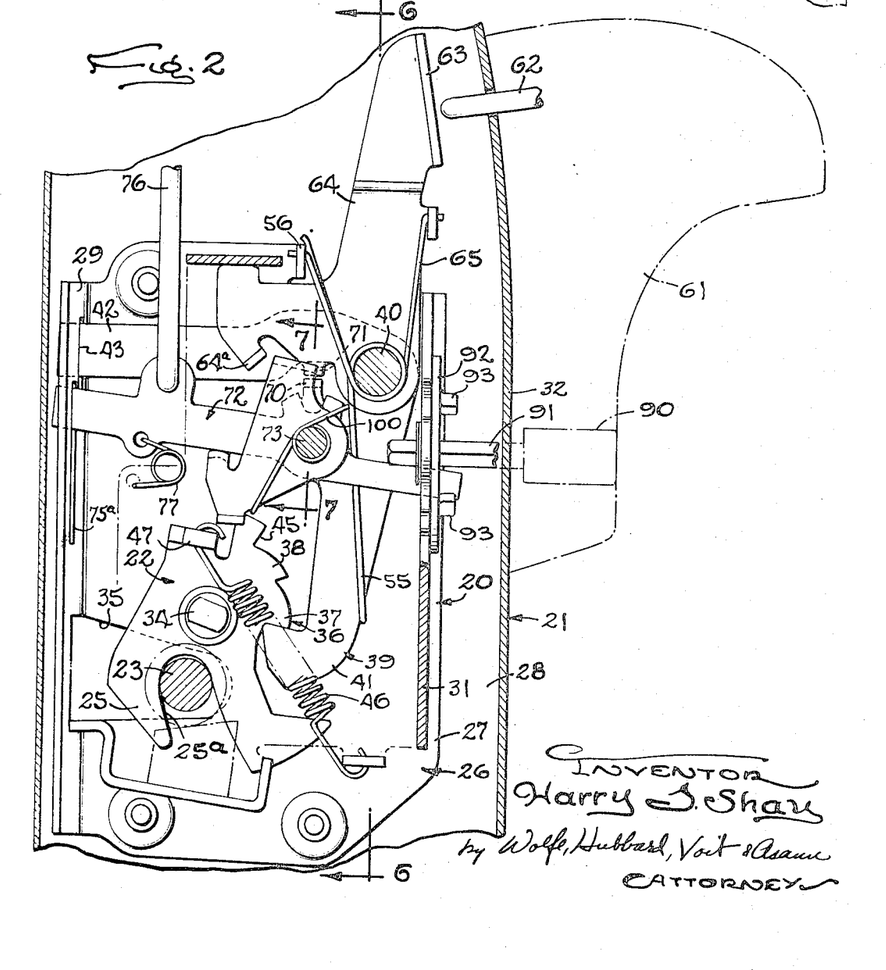
FIG. 2 is a fragmentary sectional view taken substantially along the line 2—2 of FIG. 1.
Figure 3:
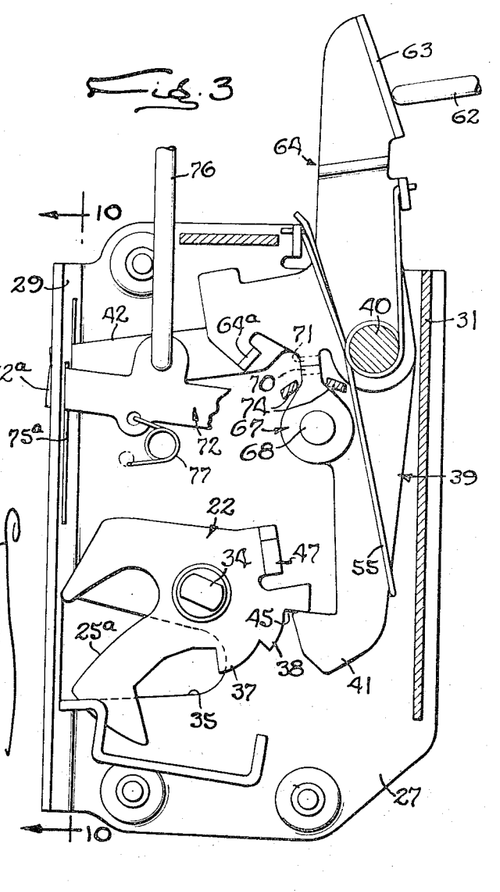
FIG. 3 is a fragmentary sectional view along the same line as FIG. 2 with some parts removed and showing the latch in an unlatched and unlocked condition.

The pawl 39 thus engages the teeth 37 and 38 on the ratchet 36 to hold the latching element 22 in the latched and safety positions, respectively, and, when the latching element is pivoted to the unlatched or released position shown in FIG. 3, the pawl rests against a stop 45 formed on the ratchet. Thus, when the pawl is swung back away from the ratchet, the latching element may turn from the position shown in FIG. 2 to that shown in FIG. 3 to release the striker 23 so the door may be opened. A contractile spring 46 extends between the base plate 27 and a flange 47 on the latching element to urge the element continuously in a clockwise direction toward the released position. The pawl is held in engagement with the ratchet by a coiled torsion spring 55 centered about the pin 40 and having one end anchored to a flange 56 on the base plate 27 and the other end extending downwardly along and engaging the edge of the pawl.

Figure 1:
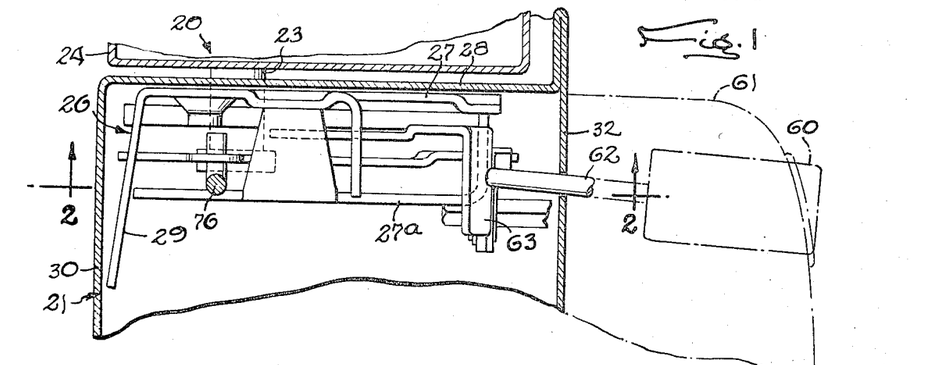
FIGURE 1 is a fragmentary transverse sectional view of one form of a latch embodying the novel features of the present invention and showing the parts in the latched position.

The latch may be released from outside the vehicle by a push button 60 (FIG. 1) slidably mounted in an outside handle 61 on the outer wall 32 of the vehicle door. For this purpose, the push button, when depressed, slides a shaft 62 inwardly into engagement with a flange 63 on an operating member or contactor 64 which, like the pawl 39, is fulcrumed on the pin 40. The contactor is rotated counterclockwise by the shaft 62 and is returned in the opposite direction by a second torsion spring 65 whose one end is anchored on the pin and whose other end is hooked around the flange 56 on the base plate 27.

Figure 11:
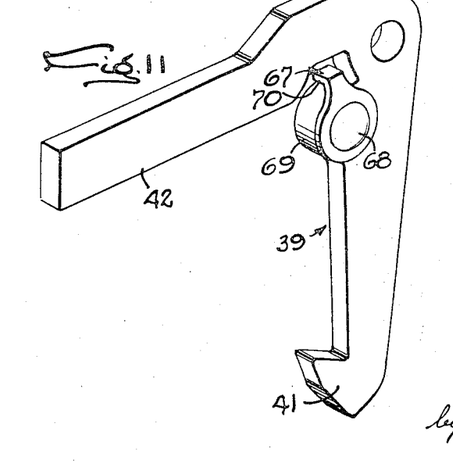
FIG. 11 is an enlarged perspective view of the pawl and the connector.
Figure 12:
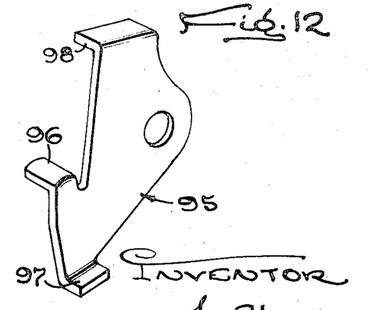
FIG. 12 is an enlarged perspective view of a cancelling lever.

The latch is locked and unlocked by uncoupling and coupling respectively, the contactor 64 and the pawl 39. When uncoupled, the contactor makes an idle motion when depressed without moving the pawl out of engagement with the ratchet. For coupling and uncoupling the contactor and pawl, a transfer member 67 is supported to swing about a pin 68 fixed to an arm 69 on the pawl (FIGS. 3 and 11). This transfer member includes a flange 70 bent normal thereto and positioned to contact an abutment 71 on the contactor when in the unlocked or coupled position shown in FIGS. 2 and 3. Thus, when the push button 60 is depressed, the contactor is pivoted counterclockwise about the pin 40 by the shaft 62 pushing on the flange 63. This brings the abutment 71 on the contactor into engagement with the flange 70 of the transfer member to turn the attached pawl counterclockwise about the pin 40 and disengage the pawl hook 41 from the ratchet 36 on the latching element 22.

Figures 9, 10:
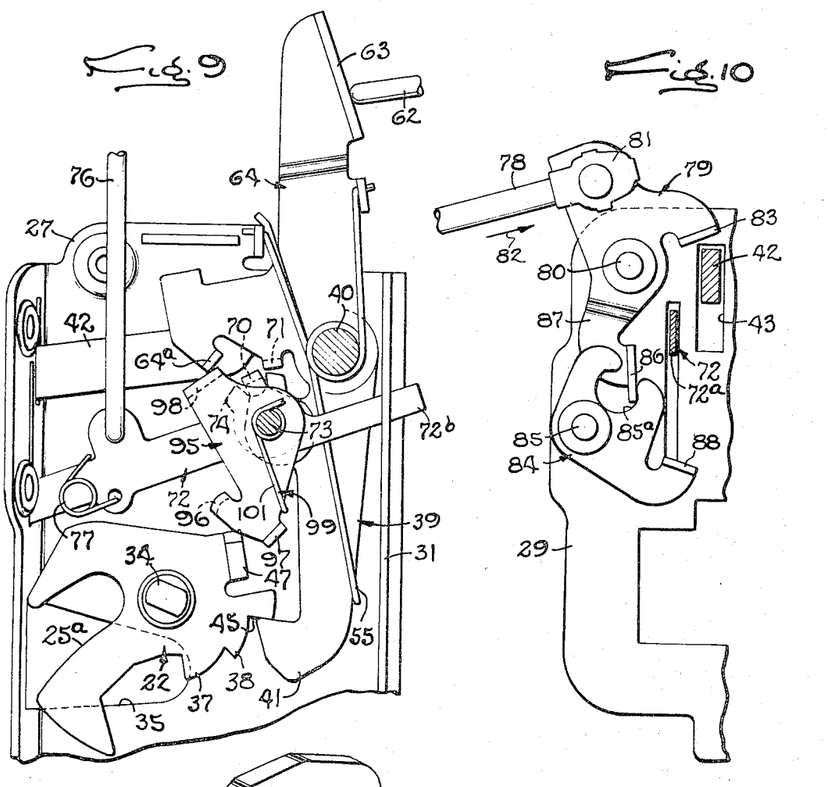
FIG. 9 is a view similar to FIG. 2 but showing the latch in the unlatched and locked condition and showing the self-cancelling action being disabled.
FIG. 10 is a fragmentary cross-section taken substantially along the line 10—10 of FIG. 3.

To lock the latch, the transfer member 67 is moved to the locked position shown in FIG. 9. When moved to this position, the transfer member is swung about its supporting pin 68 so the abutment 71 on the contactor 64 is angularly spaced from the flange 70 on the transfer member. Thus, as the contactor is moved by depressing the push button 60, the contactor simply rotates idly and the latch 20 remains locked and latched, and cannot be released from outside the door.

Figure 7:
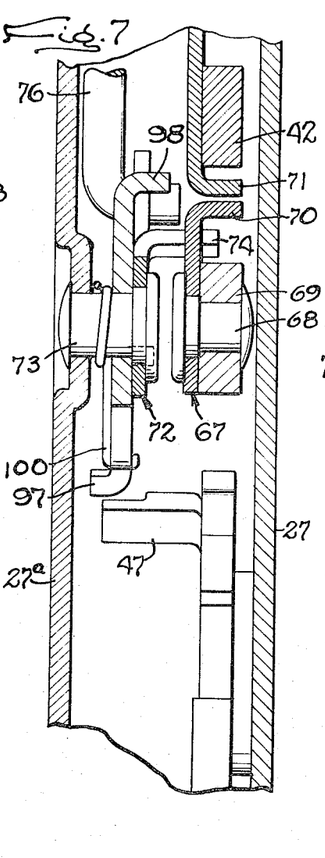
FIG. 7 is an enlarged fragmentary cross-section taken along the line 7—7 of FIG. 2.
Figure 8:
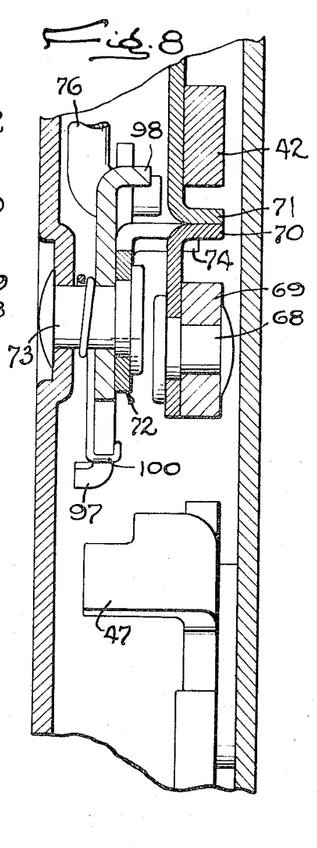
FIG. 8 is a view similar to FIG. 7 but showing the parts in moved positions.

Movement of the transfer member 67 between the locked and unlocked positions is effected through a locking lever 72 which is fulcrumed on a pin 73 fixed on a plate 27a extending between the flanges 29 and 31 (FIG. 7) and positioned coaxially with the pin 68 supporting the transfer member. The locking lever includes two spaced flanges 74 centered about the fulcrum pin 73 and bent to embrace the sides of the flange 70 on the transfer member. The flanges 74 thus are positioned such that pivoting of the locking lever about the pin 73 causes one or the other of the flanges 74 to contact the transfer member and to swing the latter between the locked and unlocked positions. Ends 72a and 72b of the locking lever extend through slots 75a and 75b of the flanges 29 and 31, respectively.

Figure 4:
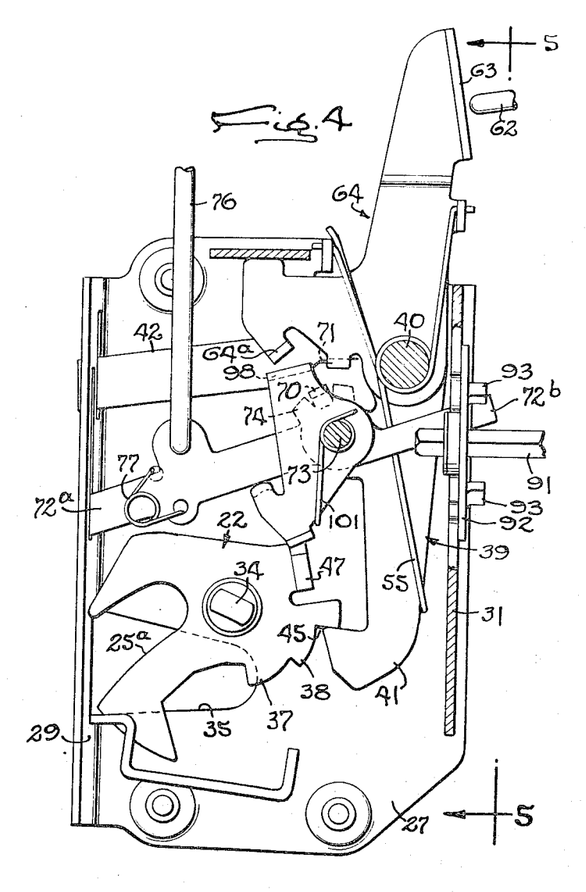
FIG. 4 is a view similar to FIG. 2 and showing the latch in an unlatched and locked condition.

To actuate the locking lever 72, a garnish button (not shown) is attached to the lever by a rod 76 fixed within an eye in the locking lever. Movement of the garnish button up and down moves the locking lever between the unlocked and locked positions shown in FIGS. 3 and 4, respectively. A torsion spring 77 fixed between the base plate 27 and the locking lever provides a snap-over-center force to hold the locking lever in either of the positions to which it is moved.

The latch also may be released by actuation of a remote handle (not shown) positioned on the inside of the door. This remote handle is connected to a rod 78 (FIG. 10) fixed to a lever 79 fulcrumed about a pin 80 on the flange 29. The rod is fixed to the lever by being passed through an opening therein and held by a washer 81. Movement of the remote lever to release the latch and open the door moves the rod from left to right, as indicated by arrow 82, thereby pivoting the lever clockwise about the pin 80 and causing a flange 83 to contact the arm 42 of the pawl 39 extending through the slot 43 in the flange 29. The pawl thus is fulcrumed about the pin 40 in a counterclockwise direction to disengage the hook 41 from the latching element.

To unlock the latch while it is being released by the remote lever 79, a second lever 84 is fulcrumed on a pin 85 on the flange 29. A recess 85a in this second lever receives a flange 86 formed as an extension of an arm 87 on the lever 79. As the lever 79 is pivoted in the clockwise direction, this flange 86 contacts the edge of the recess to pivot lever 84 counterclockwise thus causing a flange 88 thereon to contact the end 72a of the locking lever and move it upward. Thus, by one movement of the remote lever the latch is released and unlocked by pivoting both pawl and the locking lever counterclockwise.

Figure 5:
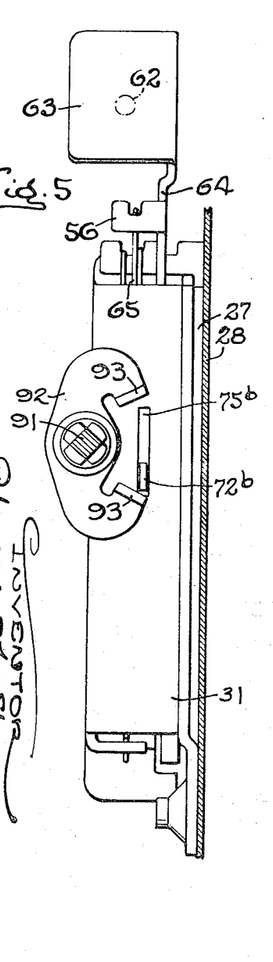
FIG. 5 is a fragmentary cross-section taken substantially along the line 5—5 of FIG. 4.
Figure 6:
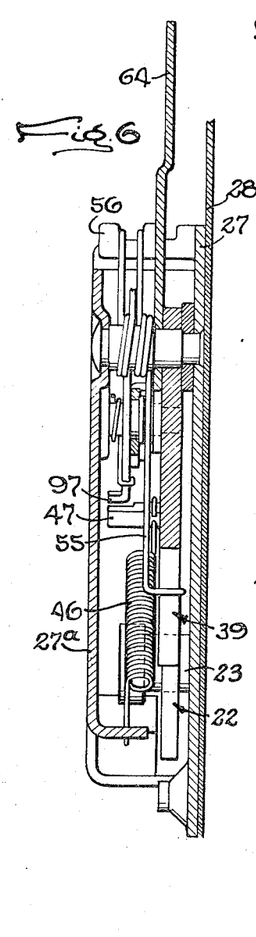
FIG. 6 is a fragmentary cross-section taken substantially along the line 6—6 of FIG. 2.

The latch may also be unlocked from outside the door by a key which is inserted in the key well 90 (FIG. 2) and rotated to turn a square shaft 91 extending through an opening in the flange 31 of the latch. As further shown in FIGS. 4 and 5, fixed to this shaft 91 is an actuator 92 including flanges 93 positioned at each end of movement of the end 72b of the locking lever extending through flange 31. By this arrangement, turning of the key in the key well clockwise or counterclockwise, as viewed in FIG. 5, pivots the locking lever 72 to the locked and unlocked positions. After being unlocked from the outside by use of a key, the latch may be released by pushing on the push button 60.

In accordance with one aspect of the present invention, a new and improved cancellation means is provided to unlock a latch of the foregoing type automatically as the latching element 22 is moved to the latched position so as to prevent unintentional locking of the door, the cancellation means being arranged in a novel manner to be disabled upon movement of the operating member through its idle motion range when the push button 60 is depressed thereby to enable locking of the door as the latter is closed. Herein, the cancellation means comprises a cancelling lever 95 fulcrumed about the pin 73 holding the locking lever and cooperating with the latching element to move the locking lever 72 to its unlocked position each time the latching element is rotated counterclockwise from the released position to the latched position. When, however, the locking lever 72 is moved to the locked position and the contactor 64 is rotated idly by depressing the door handle push button 60, the cancelling lever 95 is disabled and is prevented from moving the locking lever to the unlocked position as the latching element 22 is turned to its latched position, thereby enabling the latch to remain in a locked condition during closing of the door.

In one embodiment, these objectives are accomplished through the use of the cancelling lever 95 which contacts the locking lever 72 through a flange 96 and contacts the latching element 22 through a flange 97, thus connecting these two parts. Flange 97 is positioned in the path of movement of the flange 47 on the latching element such that rotation of the latching element in the counterclockwise direction from the released to the latched position, as viewed in FIG. 4, causes rotation of the cancelling lever in the clockwise direction. Clockwise rotation of the cancelling lever brings the flange 96 into engagement with the locking lever 72 to pivot the latter to the unlocked position concurrent with latching of the door. Inadvertent locking of the door while closing is thus avoided.

The cancelling action of the latch can be disabled while the door is being closed to enable locking the door from the outside without use of a key. First, the locking lever 72 is moved to the locked position, that is, is rotated in the counterclockwise direction as by depressing the garnish button fixed to the rod 76. Disabling the cancelling lever is effected by holding the push button 60 depressed while the door is being closed. This rotates the contactor 64 counterclockwise to the second position, as indicated in FIG. 9, with an idle motion relative to the transfer member 68 and the pawl 39. During this rotation, a flange 64a on the contactor engages a flange 98 on the cancelling lever to turn the latter counterclockwise. The cancelling lever is maintained with the flange 96 normally abutting the locking lever (as illustrated in FIG. 2) by a torsion spring 99 telescoped over the pin 73 with an arm 100 fixed to the bracket 27a and a second arm 101 hooked around the cancelling lever.

As the contactor 64 is turned counterclockwise, it swings the cancelling lever 95 with it to the position illustrated in FIG. 9. The flange 97 thus is moved out of the path of the flange 47 on the latching element 22 thus enabling the door to be locked since the latching element is free to move from the released to the latched position without acting through the cancelling lever 95 and moving the locking lever 72 to the unlocked position. Release of the push button 60 when the door is closed fully permits movement of the contactor 64 back to the first position while leaving the latch in the latched and locked position.

Figures 13, 14, 15, 16:
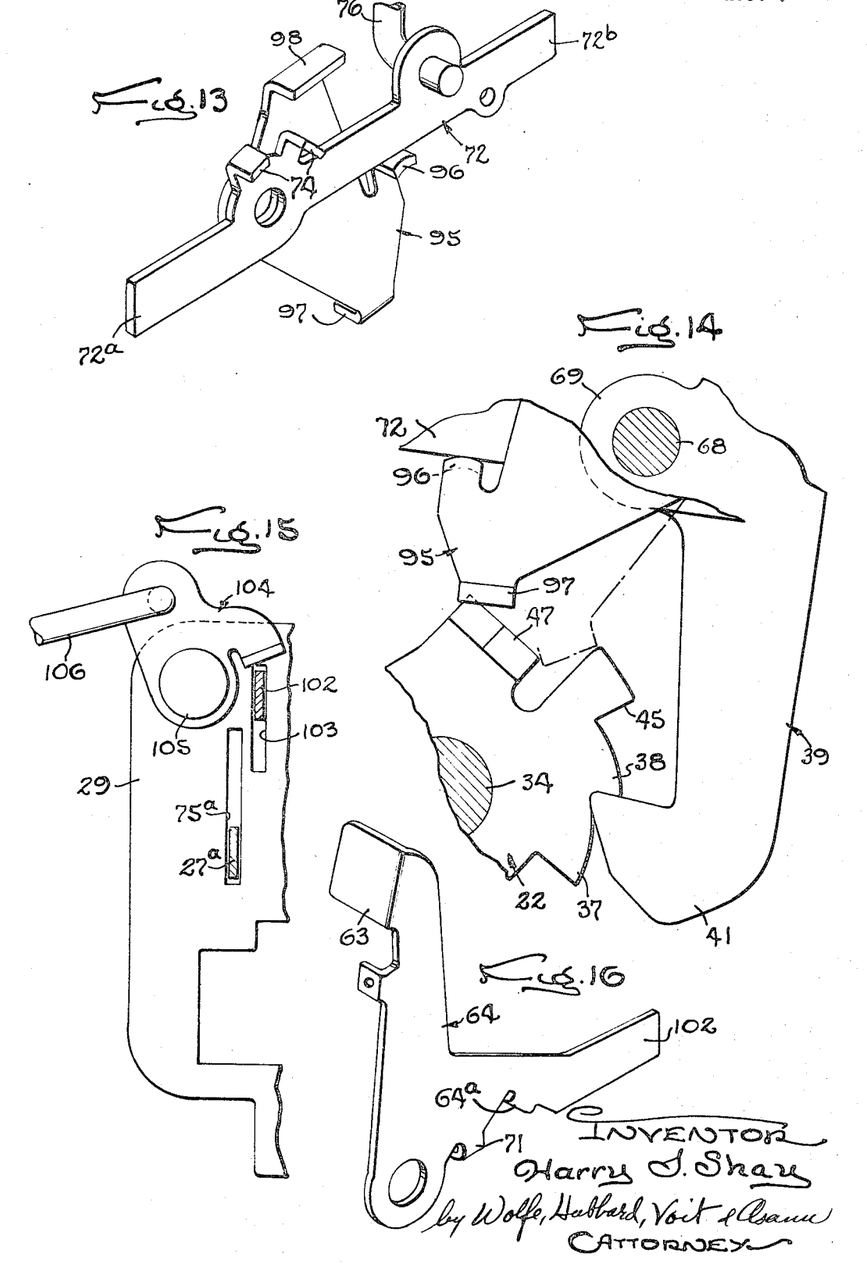
FIG. 13 is an enlarged perspective view of the cancelling lever and a locking lever.
FIG. 14 is an enlarged fragmentary elevation of the latching element, the pawl and the cancelling lever.
FIG. 15 is a side elevation of a second embodiment of a latch incorporating the features of the invention.
FIG. 16 is a perspective view of a manually actuated member for use in the embodiment of the latch shown in FIG. 15.

An advantage of this latch resides in indicating when the door is closed only sufficiently tight to secure the latching element 22 in the safety position. For this purpose, locking of the latch from the inside or by a key is prevented to serve as a warning that the door is closed only partially. As shown in FIG. 14, when the latching element 22 is moved to the safety position, the pawl 39 engages the ratchet tooth 38 on the latching element. When the latching element is in this position and locking of the latch is attempted, the flange 47 on the ratchet engages the cancelling lever flange 97 as the latter is turned counterclockwise. Thus, downward travel of the garnish button and pivoting of the locking lever 72 stops short of that necessary to lock the latch because the locking lever engages the cancellation lever flange 96. The spring 77 then returns these parts to their unlocked position when they are released. When the latching element 22 is turned fully to the latched position, the cancelling lever and locking lever function as described before since the flange 47 is no longer in the path of travel of the cancelling lever. Of course, the latch can be arranged to lock when in the safety position simply by changing the geometry and positioning of the flanges 47 and 97 so that the flange 97 will clear the flange 47 when the cancelling lever is turned counterclockwise with the latching element disposed in the safety position.

A second embodiment of the invention is shown in FIGS. 15 and 16, in which the inside remote lever, when actuated, acts through the contactor 64 to move the pawl 39 and release the latch. By this arrangement, if the latch is locked, the door cannot be opened by use of the remote lever until the latch is unlocked by some other means. For these purposes, the contactor is similar to that described in the previous embodiment but includes an arm 102 which extends through a slot 103 in the flange 29 of the bracket and cooperates with a lever 104 fulcrumed on a pin 105. The lever 104 is actuated by movement of a remote handle (not shown) on the inside of the door connecting with the rod 106. The other parts of the latch are as described before except the pawl does not include the arm 42. If the latch now is locked by shifting the locking lever 72 to move the transfer member 67 out of the path of the abutment 71, the remote handle merely makes an idle motion when actuated. The garnish button or the key mechanism now must be actuated to move the locking lever to the unlocked position before the door can be opened by actuation of the remote handle.

Figures 17, 18:
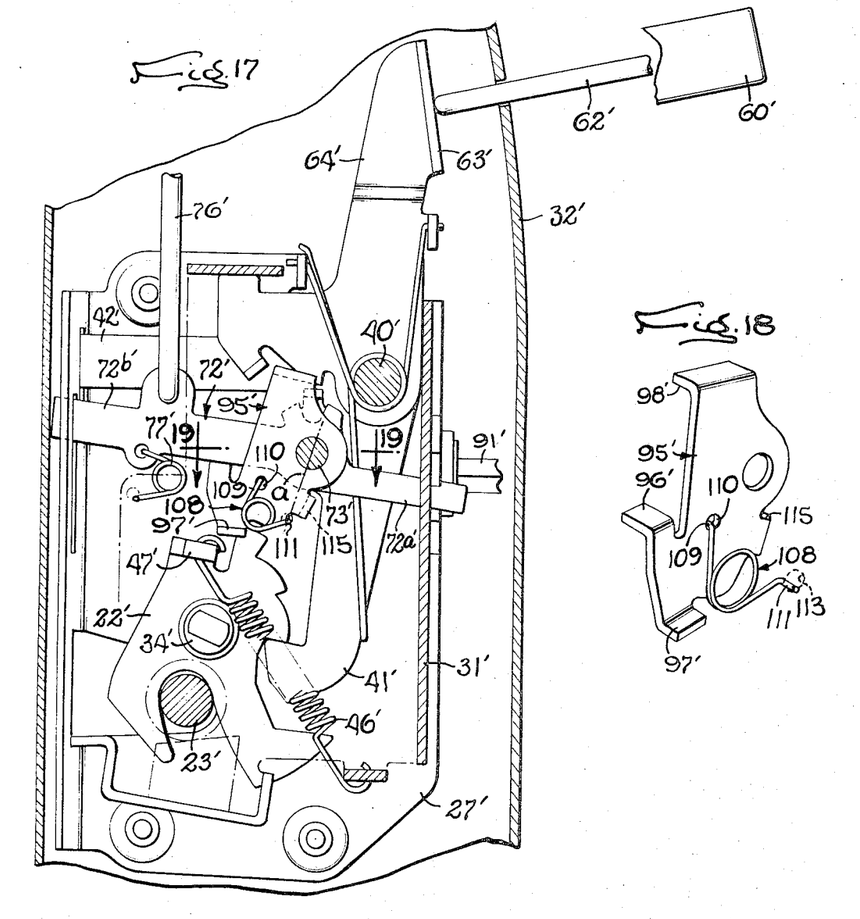
FIG. 17 is a view similar to FIG. 2 but showing a third embodiment of the latch in a latched and unlocked condition.
FIG. 18 is a perspective view of a cancelling lever for use in the embodiment of the latch shown in FIG. 17.
Figure 19:
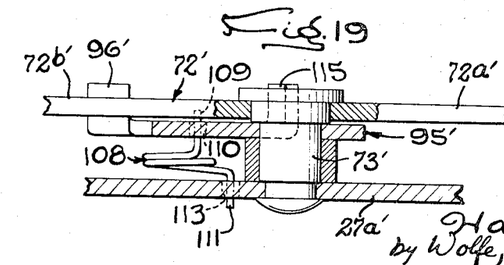
FIG. 19 is an enlarged fragmentary cross-section taken substantially along the line 19—19 of FIG. 17.
Figure 20:
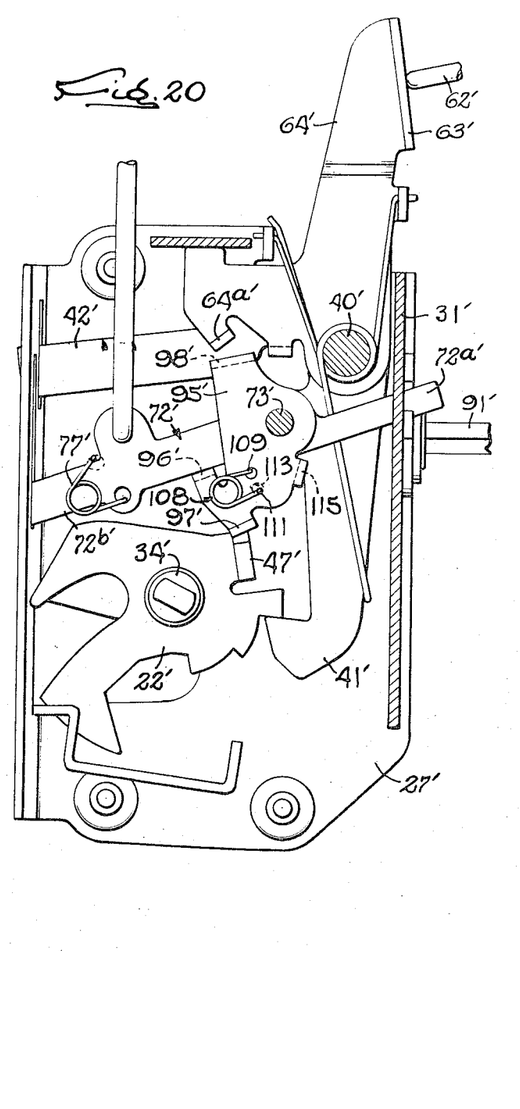
FIG. 20 is a view similar to FIG. 17 but showing the latch in an unlatched and locked condition.
Figure 21:
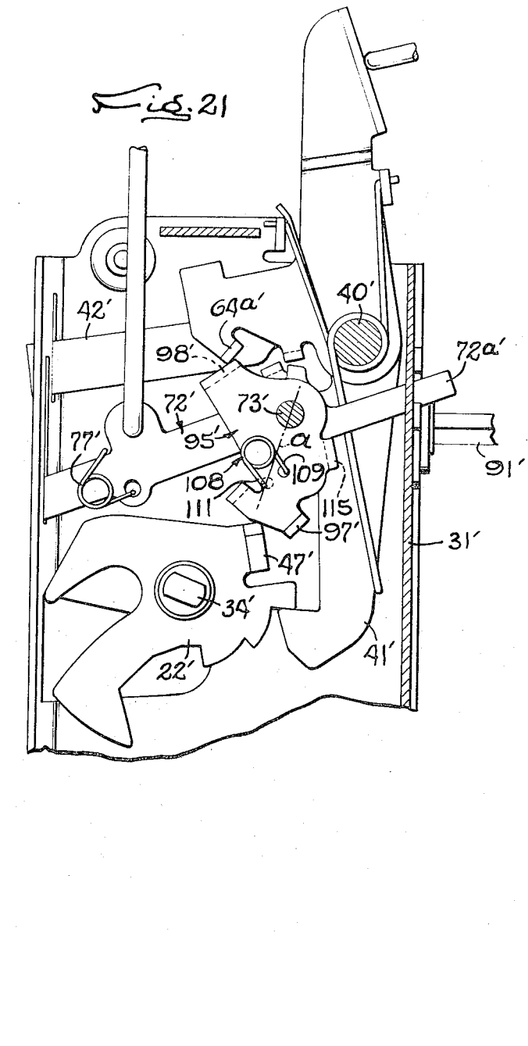
FIG. 21 is a view similar to FIG. 17 but showing the latch in an unlatched and locked condition and showing the self-cancelling action being disabled.

Still another embodiment of a latch incorporating additional novel features is shown in FIGS. 17 to 21 in which parts corresponding to the parts of the latch shown in FIGS. 1 to 14 are indicated by the same but primed reference numerals. In this instance, the cancelling lever 95' may, as illustrated, be disabled simply by depressing the push button 60' momentarily while the door is open and after the locking lever 72' has been moved to its locked position. With the cancelling lever disabled in this manner, the push button may be released, and the door may be latched and locked simply by swinging the door closed and without need of holding the push button in a depressed condition during such swinging. For this purpose, means in the form of an over-center spring 108 are provided for holding the cancelling lever in the inactive position (FIG. 21) to which the cancelling lever is swung by the idle motion of the contactor 64' when the push button is depressed with the locking lever 72' disposed in its locked position. As a result, the cancelling lever will remain in its inactive position even when the push button is released to permit the contactor to return to its normal position (FIG. 17).

As shown in FIGS. 17 and 18, the spring 108 is a coiled torsion spring disposed between the cancelling lever 95' and the plate 27a' of the supporting bracket and the ends of the spring are anchored by projecting the end 109 through a hole 110 in the cancelling lever and the end 111 through a hole 113 in the plate 27a'. When the locking lever 72' is in its unlocked position and the cancelling lever is in an inactive position (FIG. 17), the end 109 of the spring lies to the left of a center line $a$ which extends between the spring end 111 and the center of the pin 73'. Accordingly, the spring urges the cancelling lever 95' clockwise about the pin 73' in the same manner as the spring 99 in the previous embodiment and turns the cancelling lever flange 96' into abutting engagement with the end 72b' of the locking lever 72'. The end 72b' thus turns the cancelling lever 95' counterclockwise about the pin 73' to the active position shown in FIG. 20 as the locking lever is turned counterclockwise about the pin 73' to its locked position. In the active position of the cancelling lever (FIG. 20), the end 109 of the spring 108 still lies to the left of the center line a and the spring thus will return the cancelling lever clockwise to its inactive position (FIG. 17) should the locking lever be returned to its unlocked position by a manual operation. When the cancelling lever 95' is in its active position, the flange 97' is disposed in the path of the flange 47' on the latching element 22' and thus, in turning to the latched position as the door is closed, the latching element will turn the cancelling lever which, in turn, will swing the locking lever 72' to its unlocked position to unlock the latch.

To disable the cancelling lever 95' and permit locking of the door, the push button 60' is depressed momentarily to rotate the contactor 64' counterclockwise about the pin 40'. During such rotation, the flange 64a' on the contactor 64' engages the flange 98' on the cancelling lever 95' to turn the latter counterclockwise to the second inactive position (FIG. 21) in which the flange 97' is disposed out of the path of the flange 47' on the latching element 22'. As the cancelling lever turns from the active position (FIG. 20) to the second inactive position (FIG. 21) the spring 108 crosses center, that is, the end 109 of the spring moves from left to right and crosses the center line a. As the spring crosses center, it snaps the cancelling lever to the second inactive position and holds the cancelling lever in this position even though the push button 60' is subsequently released to permit the contactor flange 64a' to turn away from the cancelling lever flange 98'. Since the cancelling lever thus is disabled and is held in the inactive position, the latch will remain locked as the door is closed, and yet it is not necessary to hold the push button in a depressed condition while closing the door.

It is apparent that the locking lever 72' first must be moved manually to its locked position to move the cancelling lever 95' to its active position before depression of the push button 60' will be effective to lock the door. Should the push button be depressed when the locking lever is in its unlocked position (FIG. 17), the contactor flange 64a' simply passes by the cancelling lever flange 98' and will not turn the cancelling lever to the second inactive position. As a result, unintentional locking of the door will not be produced by an inadvertent depression of the push button, but instead, locking is accomplished only when depression of the push button is preceded by a shifting of the locking lever 72' to its locked position.

To limit counterclockwise swinging of the cancelling lever 95' under the urging of the spring 108, the lever is formed with an additional flange 115 (FIGS. 18 and 21) which engages and stops against the end 72a' of the locking lever 72' when the cancelling lever is in its second inactive position. Moreover, as the locking lever is turned clockwise when the door is unlocked either from the outside by a key or from the inside by the garnish button, the end 72a' bears against the flange 115 to turn the cancelling lever clockwise so that the spring 108 crosses reversely over the center line a and snaps the cancelling lever back to its first inactive position shown in FIG. 17.

I claim as my invention:

1. In a latch for a door, the combination of, a support, a latching element pivotally mounted on the support to turn between latched and released positions, a ratchet mounted to turn with said latching element, a pawl and operating member pivotally mounted on said support for independent movement, said pawl normally engaging said ratchet for holding the latching element in the latched position and being releasable from the ratchet to permit movement of the latching element to the released position, said operating member being movable between normal and operating positions, a transfer member pivotally mounted on said pawl to swing between positions coupling and uncoupling said operating member and pawl and operable, when in the coupling position, to transmit motion of said opearting member to said pawl thereby to move the latter out of engagement with said ratchet when said operating member is moved to the operating position, said operating member making an idle movement relative to said pawl when the transfer member is in the uncoupling position, a locking lever pivotally supported on a pin on said support for turning between locked and unlocked positions and adapted to move said transfer member to the uncoupling and coupling positions in response to such turning, a cancelling lever pivotally mounted to turn about said pin and normally disposed in the path of said latching element for moving said locking lever to the unlocked position in response to said latching element being moved to the latched position, and said operating member including an abutment for contacting said cancelling lever and pivoting the latter out of the path of said latching element when said operating member is moved to the operating position with said locking lever disposed in the locked position whereby said locking lever is retained in the locked position as the latching element moves to the latched position.

2. A latch as defined in claim 1 in which said cancelling lever includes a surface engageable with said locking lever for moving the latter to the unlocked position when the cancelling lever is turned by said latching element.

3. In a latch for a door, the combination of, a support, a latching element pivotally mounted on the support to turn between latched and released positions, a ratchet mounted to turn with said latching element, a pawl on said support and movable into and out of engagement with said ratchet, an operating member mounted on said support for movement between normal and operating positions, a transfer member movable between positions coupling and uncoupling said operating member and pawl, a locking lever on said support and movable between locked and unlocked positions for moving said transfer member to the uncoupling and coupling positions, respectively, such that, when the locking lever is moved to the unlocked position, said operating member is coupled to move said pawl out of engagement with said ratchet when said operating lever is moved to the operating position and thereby permit the latching element to turn to the released position, and when said locking member is moved to the locked position, said transfer member is positioned to uncouple said operating member and pawl so the operating member makes an idle motion when moved to the operating position, a disengageable connection normally engaged between said locking lever and said latching element for moving said locking lever to the unlocked position in response to the latching element turning from the released to the latched positions, and means responsive to said operating member being moved to the operating position for disengaging said connection whereby, by setting said locking lever in the locked position and moving the operating member to the operating position, said latch can be both latched and locked as the door is closed.

4. In a latch for a door, the combination of, a support, a latching element mounted on the support for movement between latched and released positions, releasable means for holding said latching element in the latched position, an operating member mounted on the support for movement between normal and operating positions whereby, with movement of said operating member to the operating position, said releasable means is released from holding said latching element, locking means movable between locked and unlocked positions for disabling said operating member when in the locked position to cause said operating member to make an idle movement when moved to the operating position, a disengageable connection between said latching element and said locking means normally operable to move said locking means to the unlocked position when said latching element moves to the latched position, and means responsive to movement of said operating member to the operating position to disengage said connection whereby said locking means is retained in the locked position as the latching element is moved to the latched position.

5. In a latch for a door, the combination of, a support, a latching element mounted on said support for movement between latched and released positions, a ratchet mounted to turn with said latching element, a pawl and an operator pivotally mounted on said support for independent movement, said pawl being movable into and out of engagement with said ratchet for holding the latching element in and releasing the latching element from the latched position, said operator being actuatable from the outside of the door and being movable between normal and operating positions in response to a manual actuation, a transfer member pivotally mounted to swing between positions coupling and uncoupling said operator and said pawl and operable, when in the coupling position, to transmit motion of said operator to said pawl thereby to move the latter out of engagement with said ratchet when said operator is moved to the operating position, said operator making an idle movement relative to said pawl when the operator is moved to said operating position with said transfer member disposed in the uncoupling position, a locking lever pivotally mounted on said support for turning between locked and unlocked positions and operable to move said transfer member between the coupling and coupling positions in response to such turning, a pivoted cancelling lever normally disposed in the path of said latching element for moving said locking lever to the unlocked position in response to said latching element being moved to the latched position, an abutment on said operator for contacting said cancelling lever and pivoting the latter out of the path of said latching element when said operator is moved to the operating position with said locking lever disposed in the locking position, and means operable to hold said cancelling lever out of the path of said latching element when said operator is returned from said operating position to said normal position.

6. A latch as defined in claim 5 in which said cancelling lever first is moved in one direction from a first inactive position to an active position disposed in the path of said latching element as said locking lever is moved to said locked position, and then is moved in the same direction from the active position to a second inactive position disposed out of said path when said operator is moved to said operating position, said holding means comprising an over-center spring acting on said cancelling lever to urge the latter first toward said first inactive position and then toward said second inactive position as the spring passes back and forth across center during movement of the cancelling lever between said two inactive positions.

7. A latch as defined in claim 6 in which said cancelling lever includes first and second spaced surfaces, said locking lever engaging said first surface and moving said cancelling lever from said first inactive position toward said active position when said locking lever is moved from said unlocked position to said locked position with said cancelling lever disposed in said first inactive position, and said locking lever engaging said second surface and moving said cancelling lever in the opposite direction from said second inactive position toward said active position when said locking lever is moved from said locked position to said unlocked position with said cancelling lever disposed in said second inactive position.

8. A latch as defined in claim 7 in which said second surface engages said locking lever when said cancelling lever is in said second inactive position to limit movement of said cancelling lever in said one direction under the urging of said spring.

9. In a latch for a door, the combination of, a support, a latching element mounted on said support to turn about a predetermined axis between latched and released positions, a first manual member disposed on the inside of the door, a locking lever connected to said member and being mounted on said support to turn about a second and parallel axis between locked and unlocked positions in response to manual operation of said member, said locking lever being operable when in said locked position and when said latching element is in said latched position to prevent release of the latching element from the latched position and being operable when in said unlocked position to permit release of the latching element, a cancelling lever mounted on said support to turn about an axis parallel with said predetermined axis to an active position in which the cancelling lever is operable to move said locking lever from said locked position to said unlocked position as said latching element is moved from said released position to said latched position, a second manual member operable from the outside of the door and movable between a normal position and an operating position, said second member being operable, upon movement from said normal position to said operating position when said latching element is in said released position and after said locking lever has been set in said locked position, to disable said cancelling lever by moving the latter from said active position, and means holding said cancelling lever away from said active position when said second member is returned to said normal position whereby said latching element may be moved to said latched position with said locking lever remaining in said locked position and while said second member is in said normal position.

10. A latch as defined in claim 9 in which said second manual member is mounted on said support to turn about a further parallel axis between said normal and operating positions, and further including means operable in response to movement of said second member to said operating position when said locking lever is in said unlocked position to permit release of said latching element from said latched position to said released position.

11. A latch as defined in claim 10 in which said cancelling lever first is moved in one direction from a first inactive position disposed in the path of the locking lever to said active position disposed in the paths of said latching element and said second member as said locking lever is moved to said locked position, and then is moved in the same direction from the active position to a second inactive position disposed out of the path of the latching element and in the path of the locking lever as said second member is moved to said operating position, said holding means comprising an over-center spring acting on said cancelling lever to urge the latter first toward said first inactive position and then toward said second inactive position as the spring passes back and forth across center during movement of the cancelling lever between said two inactive positions.

12. A latch as defined in claim 11 in which said locking lever engages said cancelling lever when the latter is in said second inactive position and as said locking lever is moved from said locked position to said unlocked position thereby to move the cancelling lever from said second inactive position toward said first inactive position.

13. A latch as defined in claim 12 in which said second manual member engages said cancelling lever to move the latter to said second inactive position when said second member is moved to said operating position with said cancelling lever disposed in said active position, said second member bypassing said cancelling lever and being disabled with respect to the latter when the second member is moved to said operating position with the cancelling lever disposed in said first inactive position and with said pocking lever disposed in said unlocked position.

14. A latch as defined in claim 12 in which said means releasing said latching element for movement from said latched position includes a pawl pivoted on said support, and further including a transfer member coupling said second manual member to said pawl when said locking lever is in said unlocked position thereby to transmit movement of said second member to said pawl, said transfer member being moved to a position uncoupling said second member and said pawl when said locking lever is moved to said locked position whereby said second member in moving to said operating position makes an idle motion with respect to said pawl.

References Cited

UNITED STATES PATENTS

| 3,033,602 | 5/1962 | Lee | 292—280 |
| 3,153,551 | 10/1964 | Sandor et al. | 292—280 |
| 3,309,127 | 3/1967 | Pickles | 292—216 |

RICHARD E. MOORE, *Primary Examiner.*